United States Patent Office 3,226,377
Patented Dec. 28, 1965

3,226,377
NOVEL BIS(N,N'-DIETHYLENEPHOSPHORAMIDES)
Doris Ruth Seeger, Ridgewood, and Andrew Stephen Tomcufcik, Old Tappan, N.J., assignors to American Cyanamid Company, Stamford, Conn., a corporation of Maine
No Drawing. Filed Sept. 17, 1964, Ser. No. 397,317
20 Claims. (Cl. 260—152)

This invention relates to new organic compounds and, more particularly, is concerned with novel bis(N,N'-diethylenephosphoramides) which may be represented by the following general formula:

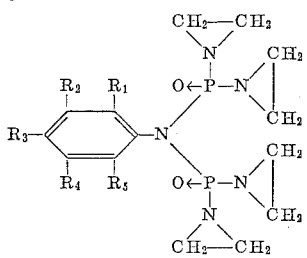

wherein $R_1$, $R_2$, $R_4$ and $R_5$ are each hydrogen, halogen or lower alkoxy and $R_3$ is hydrogen, halogen, lower alkyl, lower alkoxy, cyano, nitro, trifluoromethyl, phenylazo or p-phenyl-iminobis[bis(1-aziridinyl)phosphine oxide]. Suitable lower alkyl and lower alkoxy groups contemplated by the present invention are those having up to about 6 carbon atoms. Halogen is exemplified by fluorine, chlorine, bromine and iodine. The novel compounds of the present invention have the physical and chemical properties characteristic of typical organic phosphoramides. They are generally white, crystalline solids, relatively insoluble in petroleum ether, somewhat more soluble in benzene, toluene, xylenes and the like, and relatively soluble in water and lower alkanols.

The novel compounds of the present invention may be prepared according to the following reaction scheme:

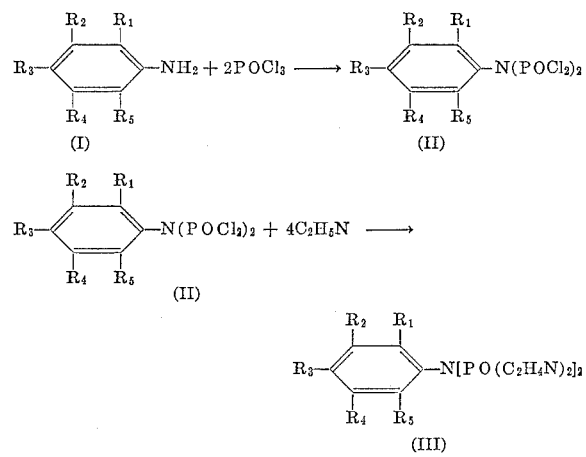

wherein $R_1$, $R_2$, $R_3$, $R_4$ and $R_5$ are as hereinabove defined. In accordance with this reaction scheme, an appropriate primary amine (I) is reacted with phosphorous oxychloride in the presence of an acid acceptor such as triethylamine, pyridine, etc. to form the corresponding diphosphoric tetrachloride (II). The intermediate diphosphoric tetrachloride may then be reacted with ethyleneimine, again in the presence of an acid acceptor, to yield the desired bis(N,N'-diethylenephosphoramides) (III). It is convenient to run both reactions in a solvent such as benzene, toluene, xylene, an ether, or the like so that the insoluble concomitantly formed acid salt (e.g., tertiary amine hydrochloride) may be separated by simple filtration. Such procedure, furthermore, obviates additional purification of the intermediate diphosphoric tetrachloride. Thus, the first reaction may be run in, for example, benzene. After substantial completion of this first reaction, the acid salt is separated by filtration, and the filtrate is added to a benzene solution of ethyleneimine. After substantial completion of the second reaction, the additional acid salt is also removed by filtration, and the final product may then be recovered from the final filtrate and purified by conventional techniques. Both reactions are run in the presence of an acid acceptor, and both reactions are ordinarily run at relatively low temperatures, 0° C. to 50° C. but most frequently at 5–10° C. The temperature may be allowed to rise as reaction nears completion.

The new compounds of the present invention are useful curing catalysts for epoxy resins. As is well known to the art, these resins are condensates of epichlorohydrin and a polyhydric alcohol, i.e., bisphenol. The curing agents have the property of changing a fusible thermosetting resinous material to an infusible thermoset resinous material. The resinous compositions are useful in a variety of applications such as molding, laminating, etc. The new compounds may be used in curing epoxy resins by methods known to the art. Thus the compounds may be added to the epoxy resin and the mixture heated to effect curing of the hard resinous products. For this purpose temperatures of from 150–180° C. may be used.

The novel compounds of the present invention also possess the property of inhibiting the growth of transplanted mouse tumors lymphosarcoma $6C_3HED$ and adenocarcinoma 72j when administered orally or intraperitoneally. However, the novel compounds of the present invention have not as yet been demonstrated to be useful in human therapy. The compounds of the present invention were tested against the tumors lymphosarcoma $6C_3HED$ and adenocarcinoma 72j by procedures described in detail by Vogel and Haynes, "Experiences With Sequential Screening for Anticancer Agents," Cancer Chemotherapy Reports No. 22, September 1962 and by Dearborn, "Recent Developments in Methods of Detecting Anti-Cancer Activity," (Symposium on Chemotherapy of Cancer), Acta Un. Int. Cancer 15 (bis), 76–84, 1959, and which can be outlined as follows:

Unit test groups are 3 mice in the adenocarcinoma 72j test and 4 mice in the lymphosarcoma $6C_3HED$ test. The animals used are a C3H inbred strain of mice weighing 18 to 20 grams. The techniques of transplanting and excising the tumors are described by Sugiura and Stock, "Studies in a Tumor Spectrum," Cancer 5, 382–402, 1952. Tumors from donor mice are minced and the particles transplanted, using a trocar, and inserted subcutaneously into the axillary region of the animals. In the adenocarcinoma 72j test, when the tumors have grown to a palpable size, the mice are grouped according to tumor size, and treatment is started. In the lymphosarcoma $6C_3HED$ test, treatment is started 2 to 3 days after implant and before tumors are palpable. Treatment is by daily intraperitoneal injection for 6 days. Tumor harvest is on the seventh day following the first treatment. In each case the tumor is weighed after excision, and the following "Activity ratio" is determined.

Activity ratio =

$$\frac{\text{Average Weight of Tumors from Control Mice}}{\text{Average Weight of Tumors from Treated Mice}}$$

Activity is then determined according to the following criteria. In the case of adenocarcinoma 72j the test compound is judged active if its activity ratio exceeds 3.72, and inactive if 1.92 or lower. Intermediate values call for a second test run. After the second test run if the product of the two activity ratios exceeds 9.94, the compound is deemed active, and inactive if 5.14 or lower. Intermediate values call for a third test run. After the third test run if the product obtained by multiplying the three activity ratios exceeds 19.1 the compound is deemed active; and inactive if lower. In the case of the lymphosarcoma 6C$_3$HED the test compound is judged active if its activity ratio exceeds 6.39, and inactive if 3.76 or lower. Intermediate values call for a second test run. After the second test run if the product of the two activity ratios exceeds 31.31, the compound is deemed active, and inactive if 18.39 or lower. Intermediate values call for a third test run. After the third test run if the product obtained by multiplying the three activity ratios exceeds 100.15, the compound is deemed active, and inactive if 100.15 or lower.

The following table summarizes the testing results for typical compounds of the present invention.

TABLE I

| Compound | Activity Ratio | |
|---|---|---|
| | 6C$_3$ HED | 72j |
| Phenyliminobis[bis(1-aziridinyl)phosphine oxide] | 52.80 | 17.70 |
| p-Trlyliminobis[bis(1-aziridinyl)phosphine oxide] | | 8.36 |
| 2-naphthyliminobis[bis(1-aziridinyl)phosphine oxide] | 206.9 | |
| p-Chlorophenyliminobis[bis(1-aziridinyl)phosphine oxide] | 28.07 | 4.32 |
| 3,5-dichlorophenyliminobis[bis(1-aziridinyl)phosphine oxide] | 11.15 | 9.54 |
| o-Methoxyphenyliminobis[bis(1-aziridinyl)phosphine oxide] | | 6.17 |
| p-Methoxyphenyliminobis[bis(1-aziridinyl)phosphine oxide] | | 7.03 |
| 3,5-dimethoxyphenyliminobis[bis(1-aziridinyl)phosphine oxide] | | 44.26 |
| p-Trifluoromethylphenyliminobis[bis(1-aziridinyl)phosphine oxide] | | 28.96 |

The invention will be described in greater detail in conjunction with the following specific examples.

EXAMPLE 1

*Preparation of phenyliminobis[bis(1-aziridinyl) phosphine oxide]*

Phenylimidodiphosphoric tetrachloride is prepared by adding 4.7 parts of aniline and 10.8 parts of triethylamine in 88 parts of dry benzene to a solution of 15.3 parts of phosphorus oxychloride in 88 parts of benzene at about 5–10° C. After filtration, the benzene solution of the tetrachloride is added slowly at 10° C. to a mixture of 8.6 parts of ethylenimine, 21.6 parts of triethylamine and 132 parts of benzene. Agitation is continued for 2 hours without cooling after which the triethylamine hydrochloride is filtered off. Benzene is distilled from the filtrate under reduced pressure and the crude product is recrystallized from benzene. The material decomposes or polymerizes on heating so that no melting point is obtained.

EXAMPLE 2

*Preparation of p-Tolyliminobis[bis(1-aziridinyl) phosphine oxide]* p-Tolyliminobis[bis(1-aziridinyl)phosphine oxide] is prepared by substituting 5.4 g. of p-toluidine for the aniline in the procedure of Example 1.

EXAMPLE 3

*Preparation of 2-naphthyliminobis[bis(1-aziridinyl) phosphine oxide]*

2 - naphthyliminobis[bis(1 - aziridinyl)-phosphine oxide] is prepared by substitutnig 7.2 parts of β-naphthylamine for the aniline in the procedure of Example 1.

EXAMPLE 4

*Preparation of p-fluorophenyliminobis[bis(1-aziridinyl) phosphine oxide]* p - Fluorophenyliminobis[bis(1 - aziridinyl) - phosphine oxide] is prepared by substituting 5.6 parts of p-fluoroaniline for the aniline in the procedure of Example 1.

EXAMPLE 5

*Preparation of p-chlorophenyliminobis[bis(1-aziridinyl) phosphine oxide]* p - Chlorophenyliminobis[bis(1 - aziridinyl)phosphine oxide] is prepared by substituting 6.4 parts of p-chloroaniline for the aniline in the procedure of Example 1.

EXAMPLE 6

*Preparation of 3,5-dichlorophenyliminobis[bis(1-aziridinyl)phosphine oxide]*

3,5 - dichlorophenyliminobis[bis(1 - aziridinyl)phosphine oxide] is prepared by substituting 8.1 parts of 3,5-dichloroaniline for the aniline in the procedure of Example 1.

EXAMPLE 7

*Preparation of o-methoxyphenyliminobis[bis(1-arizidinyl) phosphine oxide]* o - Methoxyphenyliminobis[bis(1 - aziridinyl)phosphine oxide] is prepared by substituting 6.2 parts of o-anisidine for the aniline in the procedure of Example 1. The crude product is recrystallized from a benzene-hexane mixture.

EXAMPLE 8

*Preparation of m-methoxyphenyliminobis[bis(1-aziridinyl)phosphine oxide]* m - Methtoxyphenyliminobis[bis(1 - aziridinyl)phosphine oxide] is prepared by substituting 6.2 parts of m-anisidine for the aniline in the procedure of Example 1.

EXAMPLE 9

*Preparation of p-methoxyphenyliminobis[bis(1-aziridinyl) phosphine oxide]* p - Methoxyphenyliminobis[bis(1 - aziridinyl)phosphine oxide] is prepared by substituting 6.2 parts of p-anisidine for the aniline in the procedure of Example 1.

EXAMPLE 10

*Preparation of 3,5-dimethoxyphenyliminobis[bis(1-aziridinyl)phosphine oxide]*

3,5 - dimethoxyphenyliminobis[bis(1 - aziridinyl)phosphine oxide] is prepared by substituting 7.6 parts of 3,5-dimethoxyaniline for the aniline in the procedure of Example 1.

EXAMPLE 11

*Preparation of 3,4,5-trimethoxyphenyliminobis[bis(1-aziridinyl)phosphine oxide]*

3,4,5 - trimethoxyphenyliminobis[bis(1 - aziridinyl)phosphine oxide] is prepared by substituting 9.2 parts of 3,4,5-trimethoxyaniline for the aniline in the procedure of Example 1.

EXAMPLE 12

*Preparation of m-ethoxyphenyliminobis[bis(1-aziridinyl) phosphine oxide]* m - Ethoxyphenyliminobis[bis(1 - aziridinyl)phosphine oxide] is prepared by substituting 6.8 parts of m-phenetidine for the aniline in the procedure of Example 1.

EXAMPLE 13

*Preparation of p-phenylazophenyliminobis[bis(1-aziridinyl)phosphine oxide]*

A solution of 9.9 parts of 4-aminoazobenzene and 10.8 parts of triethylamine in 240 parts of warm benzene is phosphorylated and condensed with ethylenimine by the process described in Example 1.

EXAMPLE 14

*Preparation of p,p'-biphenylenediiminotetrakis[bis(1-aziridinyl)phosphine oxide]*

A solution of 4.6 parts of benzidine and 10.8 parts of triethylamine in 175 parts of warm benzene is phosphorylated and condensed with ethylenimine by the process described in Example 1.

EXAMPLE 15

*Preparation of p-cyanophenyliminobis[bis(1-aziridinyl) phosphine oxide]* p - Cyanophenyliminobis[bis(1 - aziridinyl)phosphine oxide] is prepared by substituting 5.9 parts of p-aminobenzonitrile for the aniline in the procedure of Example 1. Impurities are removed from the crude product by successive extraction with ether, benzene and alcohol.

EXAMPLE 16

*Preparation of p-trifluoromethylphenyliminobis-[bis(1-aziridinyl)phosphine oxide]* p - trifluoromethylphenyliminobis[bis(1 - aziridinyl)-phosphine oxide] is prepared by substituting 8 parts of p-aminobenzotrifluoride for the aniline in the procedure of Example 1.

EXAMPLE 17

*2,5 - difluorophenyliminobis[bis(1 - aziridinyl)phos-[bis(1-aziridinyl)phosphine oxide]*

2,5 - difluorophenyliminobis[bis( - 1aziridinyl)phosphine oxide] is prepared by substituting 6.4 parts of 2,5-difluoroaniline for the aniline in the procedure of Example 1.

EXAMPLE 18

*Preparation of 2,4-dichlorophenyliminobis-[bis(1-aziridinyl)phosphine oxide]*

2,4 - dichlorophenyliminobis[bis(1 - aziridinyl)phosphine oxide] is prepared by substituting 8.1 parts of 2,4-dichloroaniline for the aniline in the procedure of Example 1.

EXAMPLE 19

*Preparation of 3,4-dichlorophenyliminobis-[bis(1-aziridinyl)phosphine oxide]*

3,4 - dichlorophenyliminobis[bis(1 - aziridinyl)phosphine oxide] is prepared by substituting 8.1 parts of 3,4-dichloroaniline for the aniline in the procedure of Example 1.

EXAMPLE 20

*Preparation of p-nitrophenyliminobis-[bis(1-aziridinyl)phosphine oxide]* p - nitrophenyliminobis[bis(1 - aziridinyl)phosphine oxide is prepared by substituting 6.9 parts of p-nitroaniline for the aniline in the procedure of Example 1. 1,2-dimethoxyethane is used instead of benzene as a solvent for the amine.

What is claimed is:
1. A compound of the formula:

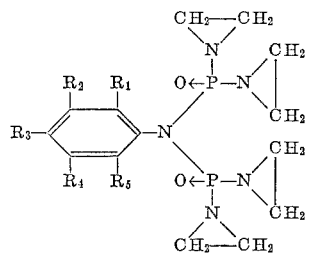

wherein $R_1$, $R_2$, $R_4$ and $R_5$ are each selected from the group consisting of hydrogen, halogen and lower alkoxy and $R_3$ is selected from the group consisting of hydrogen, halogen, lower alkyl, lower alkoxy, cyano, nitro, trifluoromethyl, phenylazo and p-phenyliminobis[bis(1-aziridinyl)-phosphine oxide].

2. Phenyliminobis[bis(1-aziridinyl)phosphine oxide].
3. p - Tolyliminobis[bis(1 - aziridinyl)phosphine oxide].
4. 2 - naphthyliminobis[bis(1 - aziridinyl)phosphine oxide].
5. 1 - naphthyliminobis[bis(1 - aziridinyl)phosphine oxide].
6. p - Fluorophenyliminobis[bis(1 - aziridinyl)phosphine oxide].
7. p - Chlorophenyliminobis[bis(1 - aziridinyl)phosphine oxide].
8. 3,5 - dichlorophenyliminobis[bis(1 - aziridinyl)phosphine oxide].
9. o - Methoxyphenyliminobis[bis(1 - aziridinyl)phosphine oxide].
10. m - Methoxyphenyliminobis[bis(1 - aziridinyl)phosphine oxide].
11. p - Methoxyphenyliminobis[bis(1 - aziridinyl)phosphine oxide].
12. 3,5 - dimethoxyphenyliminobis[bis(1 - aziridinyl)-phosphine oxide].
13. 3,4,5 - trimethoxyphenyliminobis[bis(1 - aziridinyl) phosphine oxide].
14. p - Phenylazophenyliminobis[bis(1 - aziridinyl)-phosphine oxide].
15. p - Cyanophenyliminobis[bis(1 - aziridinyl)phosphine oxide].
16. p - Trifluoromethylphenyliminobis[bis(1 - aziridinyl)phosphine oxide].
17. 2,5 - difluorophenyliminobis[bis(1 - aziridinyl)phosphine oxide].
18. 2,4 - dichlorophenyliminobis[bis(1 - aziridinyl)-phosphine oxide].
19. 3,4 - dichlorophenyliminobis[bis(1 - aziridinyl)-phosphine oxide].
20. p - Nitrophenyliminobis[bis(1 - aziridinyl)phosphine oxide].

No references cited.

NICHOLAS S. RIZZO, *Primary Examiner.*